United States Patent
Fersdahl

(10) Patent No.: US 10,061,024 B1
(45) Date of Patent: Aug. 28, 2018

(54) WEATHER RADAR BEAM DECONVOLUTION

(71) Applicant: Mark C. Fersdahl, Cedar Rapids, IA (US)

(72) Inventor: Mark C. Fersdahl, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 343 days.

(21) Appl. No.: 14/843,715

(22) Filed: Sep. 2, 2015

(51) Int. Cl.
*G01S 13/95* (2006.01)
*G01S 7/06* (2006.01)
*G01S 7/28* (2006.01)

(52) U.S. Cl.
CPC .............. *G01S 13/953* (2013.01); *G01S 7/06* (2013.01); *G01S 7/28* (2013.01)

(58) Field of Classification Search
CPC ................................. G01S 13/953; G01S 7/06
USPC ................................. 342/26 R–26 D
See application file for complete search history.

(56) References Cited

U.S. PATENT DOCUMENTS

| | | | |
|---|---|---|---|
| 5,828,332 A * | 10/1998 | Frederick | G01S 7/22 342/26 B |
| 6,879,280 B1 * | 4/2005 | Bull | G01S 7/18 342/26 B |
| 7,109,912 B1 * | 9/2006 | Paramore | G01S 13/86 342/26 B |
| 7,109,913 B1 * | 9/2006 | Paramore | G01C 23/00 342/26 B |
| 7,242,343 B1 * | 7/2007 | Woodell | G01S 7/41 342/26 B |
| 7,307,583 B1 * | 12/2007 | Woodell | G01S 7/4026 342/173 |
| 7,486,227 B2 * | 2/2009 | Mitchell | G01S 13/882 342/118 |
| 7,733,264 B1 * | 6/2010 | Woodell | G01S 13/953 342/26 B |
| 8,138,962 B2 * | 3/2012 | Bon | G01S 7/414 342/26 B |
| 8,159,369 B1 * | 4/2012 | Koenigs | G01S 7/062 340/963 |
| 2012/0086596 A1 * | 4/2012 | Insanic | G01S 7/003 342/26 D |

* cited by examiner

*Primary Examiner* — Marcus E Windrich
(74) *Attorney, Agent, or Firm* — Donna P. Suchy; Daniel M. Barbieri

(57) ABSTRACT

A weather radar module for an aircraft is described. The weather radar module includes a weather display and a processor. The processor is configured to control a radar antenna of the aircraft to perform a radar beam sweep and to receive radar returns. The processor is further configured to perform an estimation of a weather vertical location based on the radar returns, the estimation comprising estimating an altitude error correction due to a beam shape of the radar beam and due to weather model parameters of a weather model and correcting for the altitude error correction. The processor is further configured to cause the weather display to display weather based on the received radar returns, and the estimation of the weather vertical location.

18 Claims, 3 Drawing Sheets

WEATHER RADAR BEAM DECONVOLUTION

BACKGROUND

The present invention relates generally to the field of weather radar.

Pilots use weather radar systems to detect and avoid hazardous weather. The radar return signals are processed to provide graphical images to a radar display. Weather radar systems generally include an antenna, a receiver/transmitter circuit, a processor and a display. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Airborne weather radar systems are known to display vertical views of weather, where the axes are range and altitude, where the weather radar may produce a vertical weather display from multiple horizontal sweeps or a dedicated vertical sweep.

Multiple multi-scan weather radar algorithms require knowledge of the vertical location of the radar reflections. An important issue in estimating the vertical location is that the 3 dB beamwidth of an airborne weather radar antenna is very large. For example, for a typical 18 inch antenna used in airborne weather radar systems, the beamwidth is about 5 degrees. At 100 nautical miles (Nmi) in range, the width of the beam is 55 kilofeet (kft).

The broad beam resolution may result in a storm top altitude estimation error from vertical sweeps, where the altitude estimation error increases with range. The altitude estimation error may affect the accuracy of the vertical weather display, and the ability of the weather detection system to identify and detect growing weather cells.

FIG. 1 is a graph illustrating the amount of error in altitude expected from an 18 inch antenna with a 3 dB beamwidth as a function of range. Each line represents a weather cell with varying characteristics. Note that at a range of 100 Nmi the storm top error may range from 20 kft to 30 kft depending on the weather type.

One way to counteract the effects of large beamwidth is with beam deconvolution. Beam deconvolution is a method in which the shape of the main beam in essentially sharpened using signal processing methods. Methods such as inverse filtering or Wiener filtering, for example, may be used to deconvolve the beam. These processes, however, are computationally expensive and require large amounts of data to work well.

SUMMARY

In one aspect, embodiments of the inventive concepts disclosed herein are directed to a weather radar module for an aircraft. The weather radar module includes a weather display and a processor. The processor is configured to control a radar antenna of the aircraft to perform a radar beam sweep and to receive radar returns. The processor is further configured to perform an estimation of a weather vertical location based on the radar returns, the estimation comprising estimating an altitude error correction due to a beam shape of the radar beam and due to weather model parameters of a weather model and correcting for the altitude error correction. The processor is further configured to cause the weather display to display weather based on the received radar returns, and the estimation of the weather vertical location.

In a further aspect, embodiments of the inventive concepts disclosed herein are directed to a method of estimating weather for an aircraft. A radar antenna of the aircraft is controlled, via a processor, to perform a radar beam sweep and receive radar returns. An estimation of a weather vertical location is performed, via the processor, based on the radar returns, the estimation comprising estimating an altitude error correction due to a beam width of the radar beam and due to weather model parameters of a weather model and correcting for the altitude error correction. Weather based on the received radar returns, and the estimation of the weather vertical location is displayed on a weather display.

DETAILED DESCRIPTION

According to exemplary embodiments of inventive concepts disclosed herein, an alternative method to inverse filtering or Wiener filtering is described which allows for simpler and less computationally extensive data processing, and requires smaller amounts of radar return data. The method allows for altitude error estimation of radar returns based on combining the contribution of antenna beam shape and weather cell characteristics, which vary geographically, into an empirical model. This empirical method corrects for the altitude location of a radar return based on multiple parameters, such as the antenna beam shape, range, geographic location, and time of year.

Figure 2:
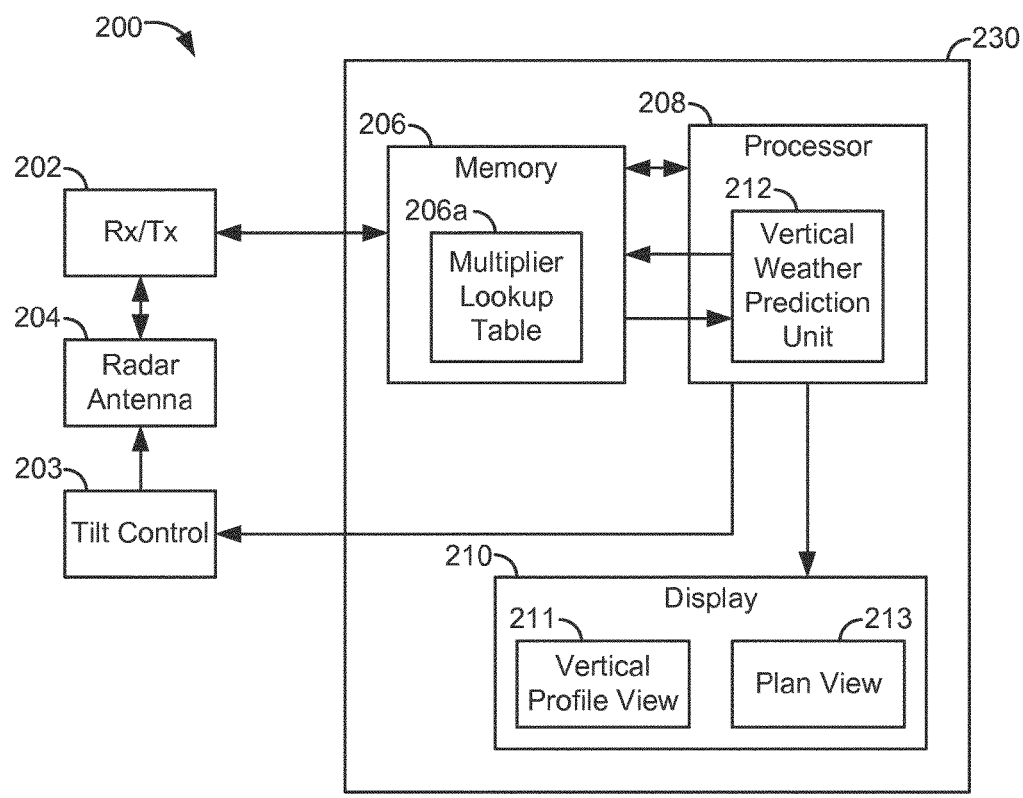
FIG. 2 is a schematic illustrating a weather radar module in a weather radar system according to inventive concepts disclosed herein.

FIG. 2 illustrates a weather radar module 230 in a weather radar system 200, which may be used on an aircraft, according to inventive concepts described herein. Weather radar system 200 can be similar to the system described in U.S. Pat. No. 7,733,264, entitled "SYSTEM AND METHOD FOR GENERATING WEATHER RADAR INFORMATION" incorporated herein by reference, for example.

Weather radar system 200 includes a weather radar receiver/transmitter 202, a weather radar adjustable antenna 204, and the weather radar module 230, which includes a processor 208, and a multi-scan, multi-tilt angle, memory 206. System 200 also includes a tilt control 203 for automatically controlling the tilt angle of the antenna (mechanically or electronically) 204. This auto control may include an additional manual control feature as well.

Multi-scan, multi-tilt angle, memory 206 is preferably capable of storing in a readily addressable and rapidly retrievable manner, at least two data sets resulting from two or more antenna sweeps at different angles. Although preferred types of memory are discussed as memory 206, module 230 can utilize any type of storage system capable of storing radar returns or associated data for analysis/processing by processor 208. In one alternative embodiment, memory 206 can store weather parameters of a weather model. The memory 206 may comprise a multiplier lookup table 206a which stores multipliers, which are multiplied by an uncorrected reference point altitude to provide an altitude error correction, as explained later in more detail.

The weather radar module 230 may include a vertical weather prediction circuit 212 and a display 210. The data in multi-scan, multi-tilt angle, memory 206 or other storage unit can be used by vertical weather prediction circuit 212 to determine weather that should be displayed on display 210.

Weather data can be stored in memory 206. The weather data can be based on received horizontal or vertical scans, and stored. The data can be stored as a mathematical model representation of the information. The mathematical model representation may be piecewise linear functions, piecewise nonlinear functions, coefficients of a cubic spline, coefficients of a polynomial function, etc. that represent vertical representations of the weather based on the horizontal scan data and/or horizontal representation of the weather based on the vertical scan data.

The display 210 can be part of an avionic multi-function display (MFD) unit. The processor 208 can be a multi-scan, multi-tilt angle, weather radar and can perform the customary functions performed by a conventional weather radar return processing unit, plus it can perform several additional operations based upon the additional data available in multi-scan, multi-tilt angle, memory 206. In general, multi-scan, multi-tilt angle, processor 208 can merge or cross qualify portions, or ranges, of the radar returns of several different antenna sweeps at several different tilt angles, so that a single relatively clutter-free image is presented to the pilot based upon the several separate scans.

Convective weather has a vertical reflectivity gradient which extends from the ground to a point where the radar can no longer detect echoes from the weather, typically at the top of the troposphere. This gradient may have similar characteristics from weather cell to weather cell. A typical weather cell will have substantial, nearly constant reflectivity between the ground and the height at which the atmospheric moisture begins to freeze, i.e., the freezing layer.

Above the freezing layer, the reflectivity falls off in a nearly linear manner until the storm generally tops out at the top of the troposphere. Functions representative of these type of gradients may be generated and stored in memory 206 for various range and azimuth locations along a flight path. Coefficients to the functions can be adjusted based on the received weather radar information. For example, some highly energetic weather cells may produce overshooting tops that intrude into the troposphere. A cells energy state can be estimated from its vertical gradient and dBz level aloft.

According to one weather model, the weather model is expressed as a polynomial function, and the weather model parameters may include a base radar beam reflectivity, and a slope of the radar beam reflectivity with respect to altitude. The weather is determined based on fitting the radar return data to the polynomial function.

The processor 208 is configured to store parametric characteristics, including the weather model parameters, of the vertical extent of the weather in memory 206 instead of detecting and storing the entire reflectivity profile in a traditional three-dimensional memory. For example, since the radar knows current altitude and outside air temperature, processor 208 can be configured to estimate the altitude of the local atmospheric freezing layer. Further, the processor 208 can estimate the altitude of the troposphere based on latitude, season, or more precise flight management system (FMS) data. Using this information and radar elevation scan data collected from normal multi-scan, multi-tilt processes, processor 208 is configured to generate a linear fit of the reflectivity data from the ground to the freezing layer and another linear fit between the freezing layer and top of the troposphere. Model parameters associated with the vertical profile in this embodiment can include the ground altitude, freezing layer altitude, the troposphere altitude, the reflectivity level at ground altitude, the reflectivity level at freezing layer altitude, and the reflectivity level at the troposphere altitude. This information is sufficient to generate a function which can generate vertical reflectivity at any altitude.

Alternative embodiments may use more complex curve fits. Specific curve fits can be utilized depending on model parameters of geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

This process allows a rapid assessment of vertical cell extent with a minimum of data. Rapid assessment may significantly increase the speed of such an assessment in turns or during initial radar power up.

Preferably, processor 208 processes weather radar returns to identify or sense the presence of weather in front of or in view of the aircraft. Vertical weather prediction preferably utilizes the altitude and the range to the weather to generate a vertical profile associated with the weather. The vertical profile can be associated with the sensing of the height of the weather system.

After vertical weather prediction circuit 212 generates a vertical profile for the weather based upon altitude and range, display 210 can show vertical profile screen 211 and plan screen 213 simultaneously. Vertical profile screen 211 may be configured to display the vertical profile generated by processor 208.

Vertical weather prediction circuit 212 can be a hardware or software implemented apparatus. In one embodiment, circuit 212 is a software routine that operates within processor 208. Although shown as part of processor 208, circuit 212 can be a separate circuit or be provided between display 210 and processor 208. According to one embodiment, circuit 212 can be implemented upon its own processor platform.

In one embodiment, vertical weather prediction circuit 212 determines the range and altitude associated with the sensed weather. The range and altitude are used so that vertical weather prediction circuit 212 can generate a vertical profile for sensed weather for display on display 210.

Altitude Error Correction

The present inventors have determined that the error in estimating the altitude, i.e., the vertical location, of weather, such as storm tops, is due to radar beam width, and also weather model parameters, in particular the model weather parameter of the slope of radar beam reflectivity with respect to altitude. The slope of radar beam reflectivity in turn varies with geographic location and time of year, i.e, the slope varies with geographic diversity.

Figure 3:
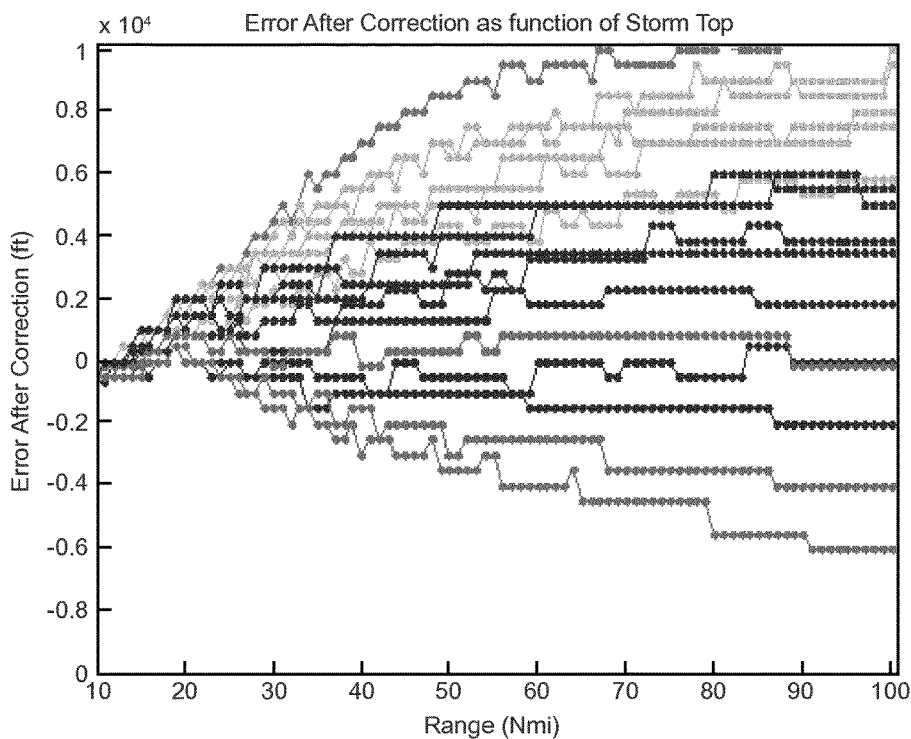
FIG. 3 is a graph illustrating the altitude error as a function of range after correction for only radar beam width, according to inventive concepts disclosed herein.

FIG. 3 is a graph illustrating the altitude error as a function of range after the altitude has been corrected for radar beam width only, i.e., not corrected for weather. Weather cell characteristics based on geographic diversity are not accounted for. As compared to the altitude error shown in FIG. 1, which has no altitude error correction, the altitude error in FIG. 3 is improved.

Figure 1:
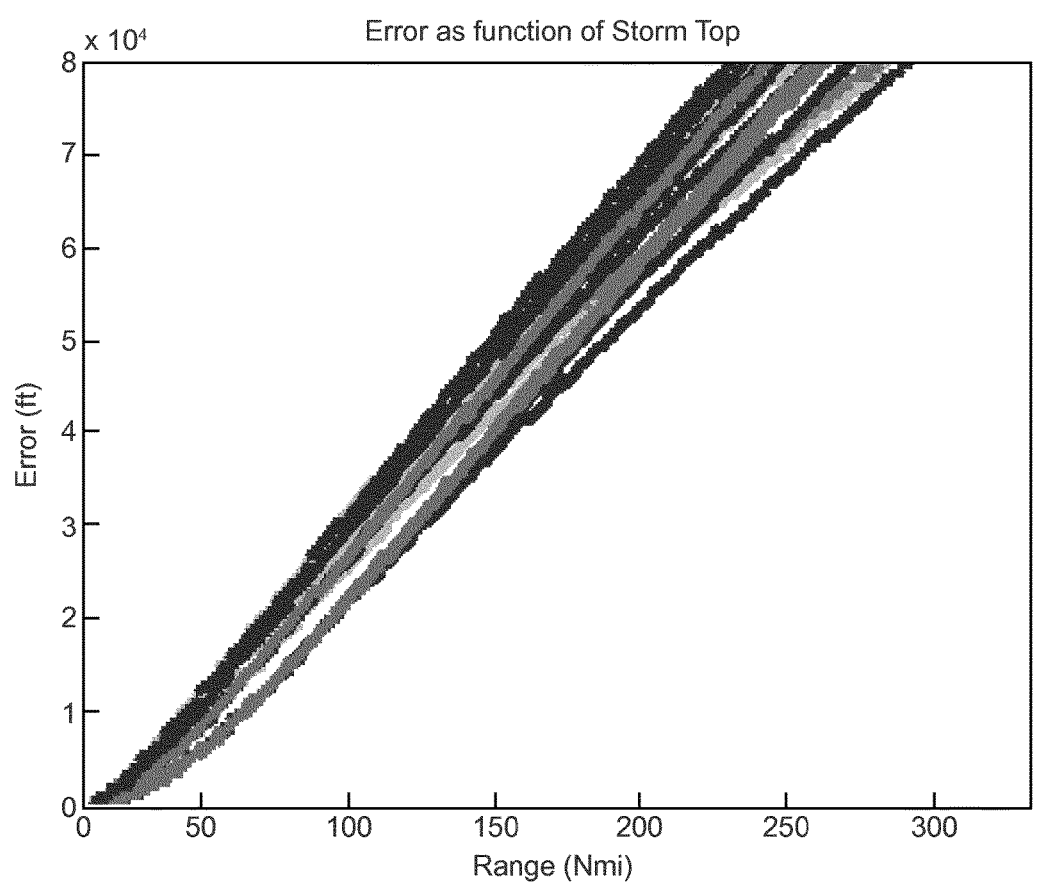
FIG. 1 is a graph illustrating the amount of error in altitude expected from an 18 inch antenna with a 3 dB beamwidth as a function of range.

The estimation of the altitude of a storm top of the weather, including error correction both for radar beam width as well as for weather model parameters, is explained with respect to the weather radar system 200 of FIG. 1. The processor 208 controls the radar antennas 204 to perform a radar sweep or sweeps, and to receive radar returns from an area of interests, such as a storm top of weather.

The processor 208 then performs an estimation of the vertical location of weather, such as the altitude of a storm top of weather, based on the radar returns. Estimating the altitude includes estimating an altitude error correction due to a beam width of the radar beam, as well as due to weather model parameters of a weather model, and then correcting for the altitude error correction. The weather model may be, for example, a mathematical model including piecewise linear functions, piecewise nonlinear functions, coefficients of a cubic spline, coefficients of a polynomial function.

According to one embodiment of the inventive concepts disclosed herein, the weather model is expressed as a polynomial function, and the weather model parameters may include a base radar beam reflectivity, and a slope of the radar beam reflectivity with respect to altitude. The weather model parameters may further include geographic diversity parameters, such as geographic location, time of day, or time of year. The base radar beam reflectivity, and a slope of the radar beam reflectivity with respect to altitude may depend on the geographic diversity parameters.

The weather model parameters may include ground altitude, freezing layer altitude, troposphere top altitude, radar reflectivity at ground altitude, radar reflectivity at freezing layer altitude, or radar reflectivity at troposphere top altitude. For example, the weather model parameters may also include radar reflectivity at freezing layer altitude, and radar reflectivity at a storm top altitude.

Once the estimation of the vertical location of weather, such as the altitude of a storm top of weather, is performed by the processor 208, the processor 208 may then control the display 210 to display weather based on the received radar returns, and the estimation of the altitude of the storm top. The display 210 may display weather in a vertical format on the plan view 213, for example, where the vertical format is expressed in range and altitude.

Altitude Error Correction Based on Multipliers

According to one embodiments of the inventive concepts disclosed herein, the processor 208 estimates an altitude error correction by determining a multiplier and multiplying an uncorrected reference point altitude by the multiplier. The uncorrected reference point altitude may be, for example, the altitude corresponding to the middle of the radar beam. The multipliers may be stored in the multiplier lookup table 206a of the memory 206.

According to this embodiment incorporating multipliers for altitude correction, the weather model may expressed as a polynomial function, where the weather model parameters include a base radar beam reflectivity, and a slope of the radar beam reflectivity with respect to altitude, where the base radar beam reflectivity, and a slope of the radar beam reflectivity with respect to altitude may depend on the geographic diversity parameters. According to this embodiment, the slope of the radar beam reflectivity varies, and the model accounts for varying slope. Thus, the multiplier values depend on geographic diversity parameters.

The multipliers stored in the lookup table 206a include multipliers for a lower value of slope of radar beam reflectivity and multipliers for an upper value of slope of radar beam reflectivity, where the slopes of the radar beam reflectivity must be between the lower value and the upper value. The multiplier is determined based on the lower value, the upper value, and an assumed value of the slope of radar beam reflectivity between the lower value and the upper value. Typical values for the lower value and the upper value are about −0.8 dBZ/kft and −2.0 dBZ/kft, respectively. If the slope lies within the lower value and the upper value, the multiplier is computed via linear interpolation from the lower value to the upper value.

The multiplier may determined based on the equation:

$$M(r)=M_L(r)+[(M_U(r)-M_L(r))*((A(r)-L(r))/(U(r)-L(r)))],$$

where $M(r)$ is the multiplier at a range r, $M_L(r)$ is the multiplier look up value at a range r for the lower value, $M_U(r)$ is the multiplier look up value at a range r for the lower value, $A(r)$ is the assumed value of the slope at a range r, $L(r)$ is the lower value of the slope at a range r, and $U(r)$ is the upper value of the slope at a range r.

The multiplier is applied to the reference point altitude to determine the correct altitude for the radar return. Since the multiplier is normalized around the storm top, care must be taken to ensure data below the storm top is not "squished" too low. This may be accomplished by referencing the multiplier tables to the freezing layer instead of mean sea level. The multiplier may applied to the reference point altitude as follows:

If the reference point altitude is above the above the freezing layer altitude, then the corrected altitude of the storm top of weather is M(r)*(uncorrected reference point altitude−freezing layer altitude)+freezing layer altitude. If the reference point altitude is below the above the freezing layer altitude then the corrected altitude of the storm top of weather is the uncorrected reference point altitude. This keeps low altitude data from being biased too low. This estimation computes a more accurate reference point for the storm top.

As an alternative to assuming the slope to be between upper and lower stored multiplier values, multipliers for each possible slope may be stored.

Figure 4:
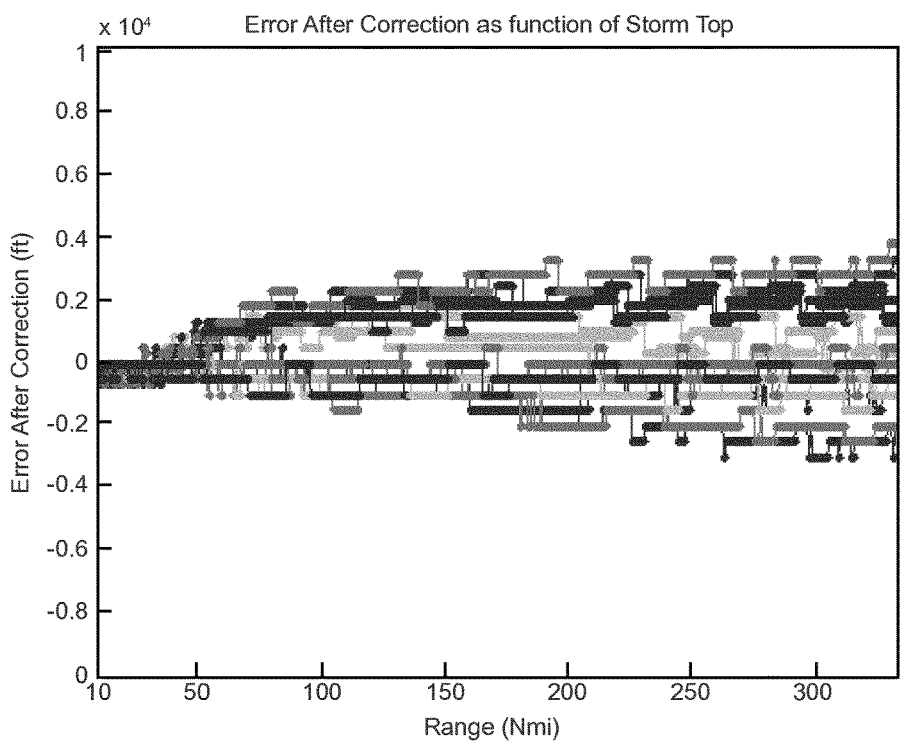
FIG. 4 is a graph illustrating the altitude error as a function of range after correction for both radar beam width and geographic diversity of the weather, according to inventive concepts disclosed herein.

FIG. 4 is a graph illustrating the altitude error as a function of range after the altitude has been corrected for both radar beam width and geographic diversity of the weather. As compared to FIG. 3, it can be seen that correcting for both radar beam width and geographic diversity of the weather results in a much reduced error.

The systems and methods described herein is described allow for simpler and less computationally extensive data processing than inverse filtering or Wiener filtering, and further require smaller amounts of radar return data. The systems and methods described herein allow for altitude error estimation of radar returns based on combining the contribution of antenna beam shape and weather cell characteristics, which vary geographically, into an empirical model.

The embodiments of the invention have been described in detail with particular reference to preferred embodiments thereof, but it will be understood by those skilled in the art that variations and modifications can be effected within the spirit and scope of the invention.

What is claimed is:

1. A weather radar module for an aircraft, comprising:
a weather display; and
a processor configured to:
control a radar antenna of the aircraft to perform a radar beam sweep and to receive radar returns;
perform an estimation of a weather vertical location based on the radar returns, the estimation comprising estimating an altitude error correction due to a beam shape of the radar beam and due to weather model parameters of a weather model and correcting for the altitude error correction; and
cause the weather display to display weather based on the received radar returns, and the estimation of the weather vertical location,
wherein the estimating an altitude error correction comprises determining a multiplier and multiplying an uncorrected reference point altitude by the multiplier.

2. The module for an aircraft of claim 1, wherein the weather display is a vertical weather display displaying weather in a vertical format.

3. The module for an aircraft of claim 2, wherein the vertical format is expressed in range and altitude.

4. The module for an aircraft of claim 1,
wherein the weather model has weather model parameters including base radar beam reflectivity and slope of radar beam reflectivity with respect to altitude.

5. The module for an aircraft of claim 4,
wherein the weather model parameters include geographic diversity parameters.

6. The module for an aircraft of claim 5, wherein the weather geographic diversity parameters includes at least one of geographic location, time of day, or time of year.

7. The module for an aircraft of claim 4,
wherein the weather model parameters include at least one of ground altitude, freezing layer altitude, troposphere top altitude, radar reflectivity at ground altitude, radar reflectivity at freezing layer altitude, or radar reflectivity at troposphere top altitude.

8. A weather radar module for an aircraft, comprising:
a weather display; and
a processor configured to:
control a radar antenna of the aircraft to perform a radar beam sweep and to receive radar returns;
perform an estimation of a weather vertical location based on the radar returns, the estimation comprising estimating an altitude error correction due to a beam shape of the radar beam and due to weather model parameters of a weather model and correcting for the altitude error correction; and
cause the weather display to display weather based on the received radar returns, and the estimation of the weather vertical location,
wherein the weather model has weather model parameters including base radar beam reflectivity and slope of radar beam reflectivity with respect to altitude,
wherein the weather model parameters include radar reflectivity at freezing layer altitude, and radar reflectivity at a storm top altitude.

9. The module for an aircraft of claim 1, wherein the determining the multiplier comprises determining the multiplier based on values of multipliers stored in a lookup table.

10. The module for an aircraft of claim 9, wherein the multipliers stored in the lookup table include multipliers for a lower value of slope of radar beam reflectivity and multipliers for an upper value of slope of radar beam reflectivity, and the determining the multiplier is based on the lower value, the upper value, and an assumed value of the slope of radar beam reflectivity between the lower value and the upper value.

11. The module for an aircraft of claim 10, wherein the multiplier is determined based on the equation: $M(r) = M_L(r) + [(M_U(r) - M_L(r)) * ((A(r) - L(r))/(U(r) - L(r)))]$,
where $M(r)$ is the multiplier at a range r, $M_L(r)$ is the multiplier look up value at a range r for the lower value, $M_U(r)$ is the multiplier look up value at a range r for the upper value, $A(r)$ is the assumed value of the slope at a range r, $L(r)$ is the lower value of the slope at a range r, and $U(r)$ is the upper value of the slope at a range r.

12. A method of estimating weather for an aircraft, comprising:
controlling, via a processor, a radar antenna of the aircraft to perform a radar beam sweep and receive radar returns;
performing, via the processor, an estimation of a weather vertical location based on the radar returns, the estimation comprising estimating an altitude error correction due to a beam width of the radar beam and due to weather model parameters of a weather model and correcting for the altitude error correction; and
displaying, on a weather display, weather based on the received radar returns, and the estimation of the weather vertical location,
wherein the estimating an altitude error correction comprises determining a multiplier and multiplying an uncorrected reference point altitude by the multiplier.

13. The method of claim 12, wherein the weather display is a vertical weather display displaying weather in a vertical format.

14. The method of claim 12,
wherein the weather model has weather model parameters including base radar beam reflectivity and slope of radar beam reflectivity with respect to altitude.

15. The method of claim 14,
wherein the weather model parameters include geographic diversity parameters including at least one of geographic location, time of day, or time of year.

16. The method of claim 12, wherein the determining the multiplier comprises determining the multiplier based on values of multipliers stored in a lookup table.

17. The method of claim 16, wherein the multipliers stored in the lookup table include multipliers for a lower value of slope of radar beam reflectivity and multipliers for an upper value of slope of radar beam reflectivity, and the determining the multiplier is based on the lower value, the upper value, and an assumed value of the slope of radar beam reflectivity between the lower value and the upper value,
wherein the multiplier is determined based on the equation: $M(r) = M_L(r) + [(M_U(r) - M_L(r)) * ((A(r) - L(r))/(U(r) - L(r)))]$,
where $M(r)$ is the multiplier at a range r, $M_L(r)$ is the multiplier value at a range r for the lower value, $M_U(r)$ is the multiplier value at a range r for the upper value, $A(r)$ is the value of the slope at a range r, $L(r)$ is the lower value of the slope at a range r, and $U(r)$ is the upper value of the slope at a range r.

18. The method of claim 16, wherein the multipliers stored in the lookup table include multipliers for each possible slope of radar beam reflectivity according to the weather model parameters.

* * * * *